(12) United States Patent
Yeoman et al.

(10) Patent No.: US 6,783,267 B1
(45) Date of Patent: Aug. 31, 2004

(54) LIGHT WITH SWITCH

(76) Inventors: Todd W. Yeoman, 2905 LaVanture Pl., Elkhart, IN (US) 46514; Gregory A. Neff, 2905 LaVanture Pl., Elkhart, IN (US) 46514

( * ) Notice: Subject to any disclaimer, the term of this patent is extended or adjusted under 35 U.S.C. 154(b) by 0 days.

(21) Appl. No.: 10/409,015

(22) Filed: Apr. 8, 2003

Related U.S. Application Data

(60) Provisional application No. 60/446,659, filed on Feb. 11, 2003.

(51) Int. Cl.[7] .................................................. B60Q 1/00
(52) U.S. Cl. ........................ 362/485; 362/394; 362/540
(58) Field of Search .................................. 362/485, 155, 362/496, 295, 394, 276, 802, 540; 340/468

(56) References Cited

U.S. PATENT DOCUMENTS

| | | | | |
|---|---|---|---|---|
| 4,896,136 A | * | 1/1990 | Hotovy | 340/468 |
| 5,602,526 A | * | 2/1997 | Read | 340/457 |
| 5,795,051 A | * | 8/1998 | Galanski | 362/485 |
| 5,975,713 A | * | 11/1999 | Brothers | 362/155 |
| 6,102,548 A | * | 8/2000 | Mantle et al. | 362/155 |
| 6,238,068 B1 | * | 5/2001 | Farmer, Jr. | 362/485 |

* cited by examiner

*Primary Examiner*—Thomas M. Sember
(74) *Attorney, Agent, or Firm*—Botkin & Hall, LLP; James D. Hall

(57) ABSTRACT

A light fixture with a light is electrically controlled by a magnetic switch positioned about the juncture between a door or movable cap and the frame such that the light may be switched on when the door or cap is away from the frame and the light may be switched off when the door or cap is closed next to the frame.

7 Claims, 3 Drawing Sheets

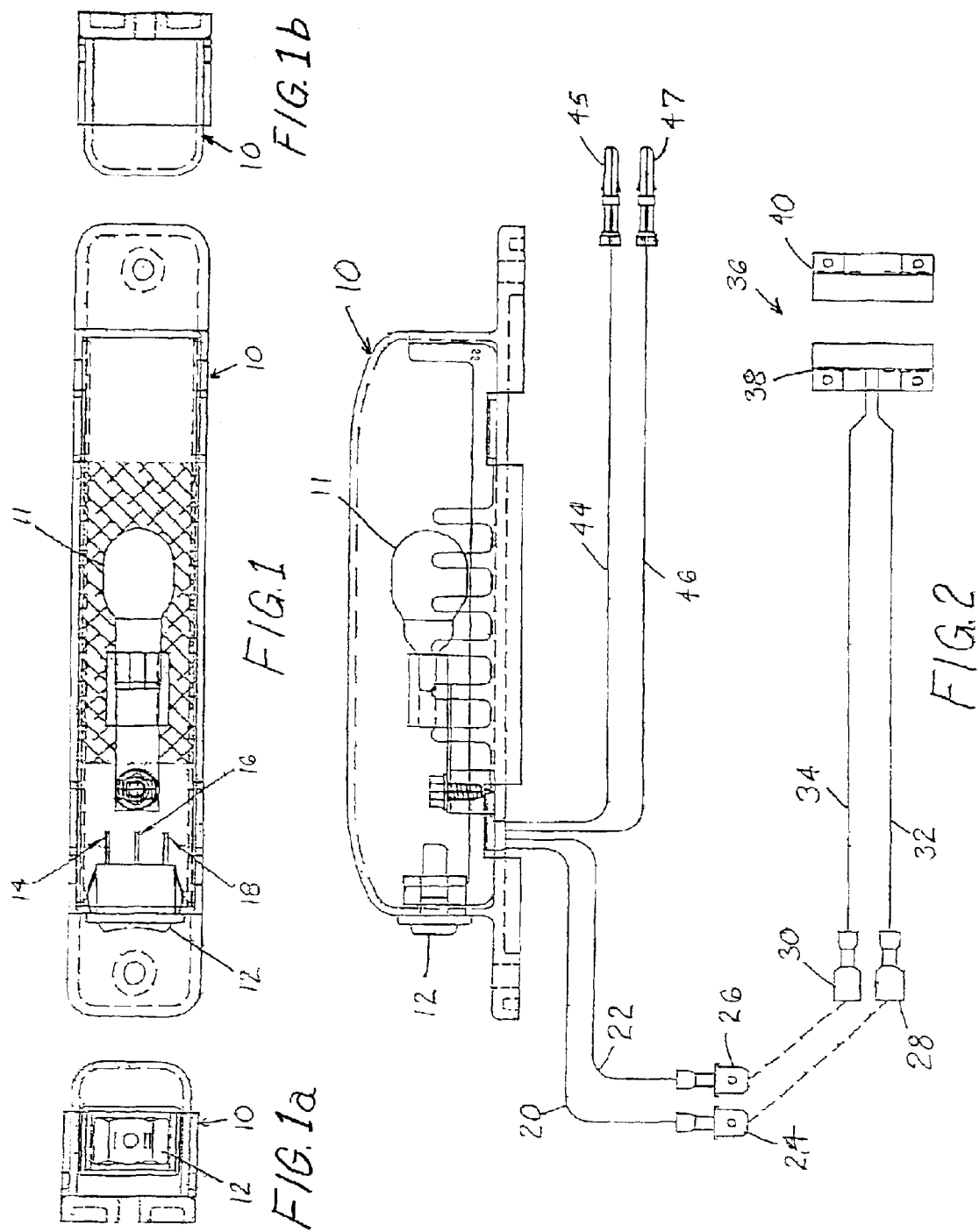

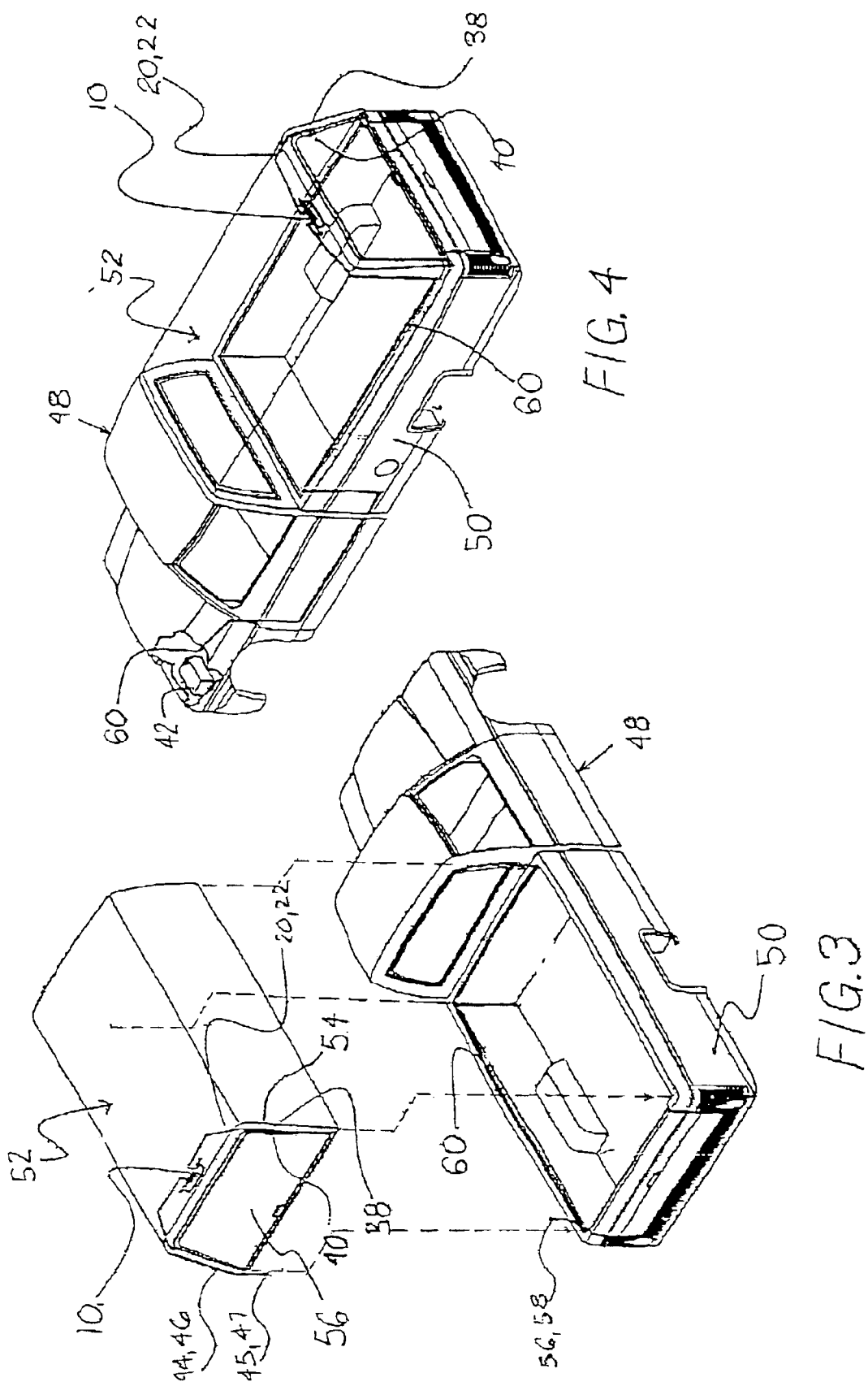

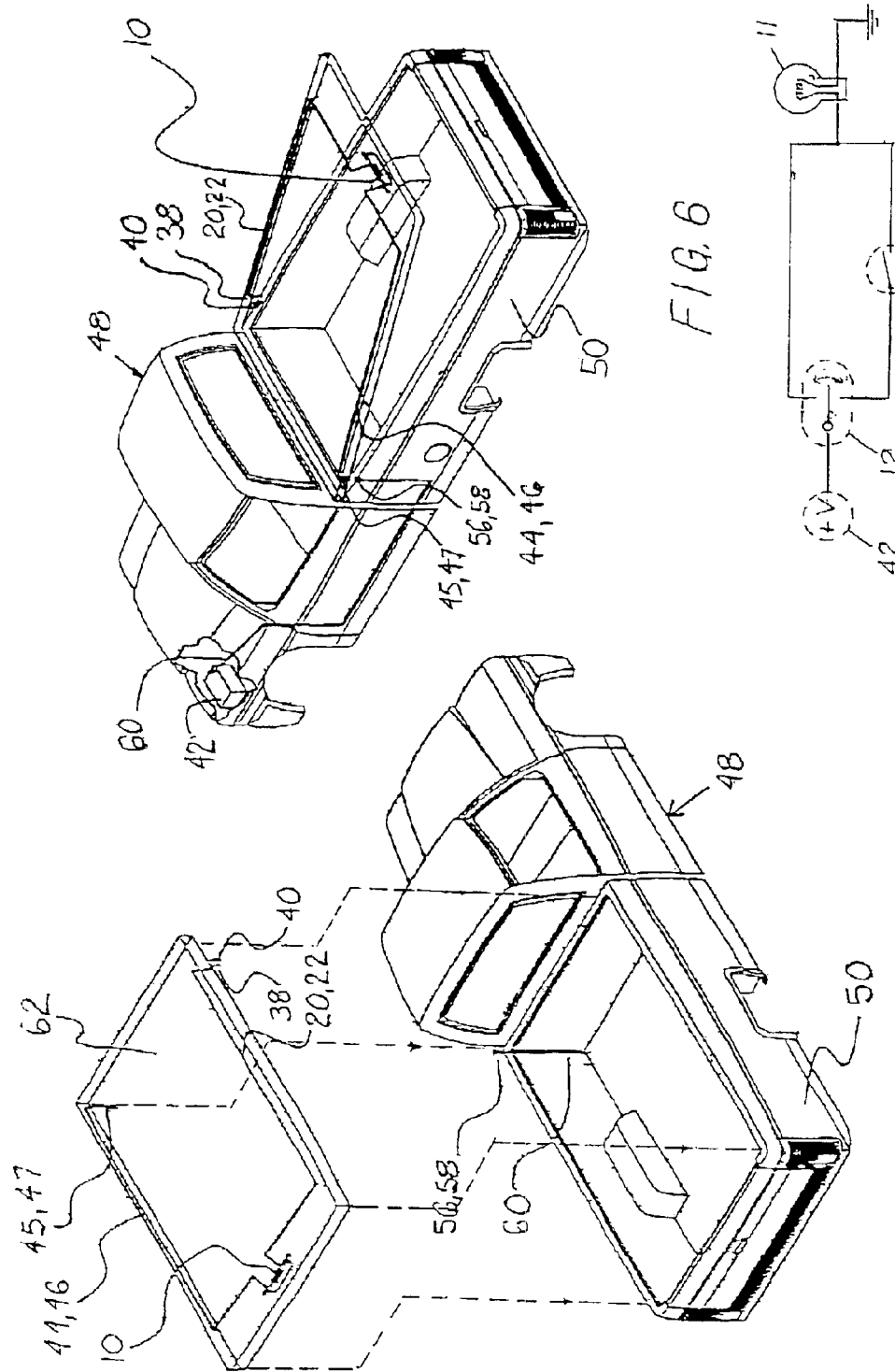

LIGHT WITH SWITCH

This Non-Provisional Patent Application claims the benefit of Provisional U.S. patent application Ser. No. 60/446,659, filed Feb. 11, 2003.

GENERAL FIELD OF THE INVENTION

This invention relates to a light with a switch. More specifically a light connected to a magnetic switch for mounting about a door and frame.

BACKGROUND OF THE INVENTION

Bedded vehicles such as pickup trucks are often retrofitted with a rigid cover such as a truck cap or tonneau cover over the bed. When such a covering is mounted to the bed, it is desirable to add a light on the inside of the cover to illuminate the interior of the bed when the cover or cap is open. A switch is also desired to turn the light on and off either at the will of the operator or when the bed is opened and closed. Current industry standards provide such a light by mounting a twelve volt light fixture on the bed cover and use either a single pole single throw (SPST) rocker switch that allows the user to turn the light on and off or to activate the light by placing a plunger style switch on the rear window frame or cover support structure whereby the switch is turned on and off by opening and closing the cover.

There are problems associated with each of these current industry standards, however. The SPST switch is inconvenient because an operator must find the switch and manually turn it on to activate it, which can be inconvenient in the dark. The plunger style switch is difficult to install because the installer must control the specific location and factory set, preloaded throw distance of the switch. Because the distance between the vehicle bed and a cover varies from one manufacture to another—ranging from approximately 0.25 inches to over 0.75 inches—each installation, if possible at all, requires the installer to specially locate the switch so that a closed cover will actually turn the light off. Because of the standardized size of the plunger switch and the variable distance between the rear window frame or cover support structure and the closed position of the cover, installation of a plunger type of switch sometimes may not even be possible to produce the desired on/off results.

SUMMARY OF THE INVENTION

The invention herein presents a light fixture with a magnetic switch interposed between the light and the power source. The magnetic switch is located near the cap/frame interface with one switch part affixed to one of the cap or frame and the other switch part affixed to the other of the cap or frame. The magnetic switch and light fixture are wired such that when the magnetic field of the magnetic switch is disturbed the light will be turned either on or off. The magnetic switch allows for installation of the light and magnetic switch combination to provide on/off switching of the light when installed on doors and frames where the distance between the door and the frame can vary.

An object of this invention is to provide a light fixture that is easily installed on a vehicle with a door or lid thereon, regardless of variable distances between the door and frame when closed, and which allows the light to turn on when the door or lid is opened and off when the door or lid is closed. Other objects of the invention will become apparent from the detailed description provided below.

BRIEF DESCRIPTION OF THE DRAWINGS

These and other aspects of the invention will be apparent from the following description, with reference to the accompanying drawings, in which:

FIG. 1 is a top view of the light fixture with end views FIG. 1a and FIG. 1b on either side;

FIG. 2 is a side view of the light fixture and shows the basic wiring of the fixture to the magnetic switch and to the power source;

FIG. 3 shows a bedded vehicle and a cover to be mounted on the vehicle;

FIG. 4 shows the bedded vehicle and cover of FIG. 3 with the cover attached over the bed of the vehicle and the light fixture and magnetic switch mounted to the cover;

FIG. 5 shows the bedded vehicle of FIG. 3 with a second covering for attachment to the vehicle;

FIG. 6 shows the bedded vehicle and cover of FIG. 5 with the cover attached over the vehicle bed and the light fixture and switch attached to the cover; and, FIG. 7 is a circuit diagram of the light and switches.

DETAILED DESCRIPTION

Referring now to the drawings, FIGS. 1 and 2 present a light fixture 10 including a twelve-volt light bulb 11 and a three position single pole double throw (SPDT) switch 12 integrally mounted thereon. SPDT switch includes three terminals, output terminal 14, input terminal 16, which is for twelve volt power input, and output terminal 18. As depicted in FIG. 7, SPDT switch 12 thereby presents three switch positions: a centered off position and two lateral on positions, one for each input terminal. In one on position the light is connected directly to power source so as to be always on. In the other on position the light can be wired through a second switch 36 such that the light's on or off state is determined by the open or closed position of the second switch. Input wire 20 and output wire 22 are connected to light fixture 10 with terminals 24, 26 connecting to terminals 28, 30 carried by input wires 32 and output wires 34 connected to remote magnetic switch 36. Magnetic switch 36 is of the type including a switch part 38 to which input/output wires 32, 34 are attached and a magnetic source 40 separate from switch part. Switch part 38 contains a reed contact for activation under the influence of a magnetic field, and magnetic source 40 provides the magnetic field to activate or move the reed contact of the switch part from one of an open or closed position to the other position. Light fixture 10 is also connected to power source 42 by input wire 44 and output wire—or ground—46, which provide electrical power to the light fixture and magnetic switch 36.

Referring to FIGS. 3 and 4, a bedded vehicle 48 having a bed 50 is shown in fragmented form and is of any common commercial construction. A cap 52—a common truck cap—having a frame 54 and a door 56 is shown in FIG. 3 spaced above vehicle 48 and is shown in FIG. 4 attached to vehicle bed 50.

Light fixture 10 is mounted to cap frame 54 with common fasteners (not shown). Magnetic switch 36 is mounted between door 56 and frame 54. Switch part 38 is mounted with fasteners (not shown) to frame 54, and magnetic source 40 is mounted to door 56 in a position such that the switch part is spaced less than approximately 1.00 inches from the magnetic source when the rear window 56 is closed and spaced more than approximately 1.00 inches from the switch part when the door is open. Twelve volt positive wire 44 and ground wire 46 are carried by cap frame 54 and connected by terminals 45, 47 to appropriate terminals 56, 58 on a wire harness 60 that is secured within the vehicle body and electrically connected to a twelve volt battery 42 carried by the vehicle and a ground.

Referring to FIGS. 5 and 6, light fixture 10 and magnetic switch 36 are shown mounted to a second type of bed cover—commonly known as a tonneau cap or lid—62 which is mounted to truck bed 50. FIG. 5 depicts Tonneau lid 62 above truck 48 and FIG. 6 depicts Tonneau 62, as it would be ordinarily installed on truck 48 in the open position. Similarly as before, light fixture 10 is affixed to Tonneau cover 62 with input output wires 44, 46 carried by lid and attached by terminals 45, 46 to corresponding terminals 56, 58 on truck electrical harness 60 which is connected twelve volt truck battery 42 and ground. Light switch 36, however, is mounted between the interface between cover 62 and vehicle bed 50 with switch part 38 carried by lid 62 and magnetic source 40 carried by the bed. Switch part 38 and magnetic source 40 must be so located such that they arc spaced less than approximately 1.00 inches from each other when cover 62 is closed on bed 50 and spaced more than approximately 1.00 inches from each other when the cover is open. Switch part 38 is appropriately connected to light fixture 10 through input output wires 20, 22 carried by cover 62.

In operation, light fixture 10 is connected to battery source 42 via input wire 42 connected to input terminal 16. Light 11 is directly wired between terminal 16 and one of terminals 14 or 18 such that when switch 12 is thrown to connect terminal 16 to that one terminal 14 or 18, the light is always on. Magnetic switch 36 is connected between terminal 16 and the other of terminals 14 or 18 such that when switch 12 is thrown to connect terminal 16 with that other terminal 14 or 18, electrical power from battery 42 is directed through the magnetic switch part 38 via wires 20, 22, 32, 34. The light will be on when the cover is opened so that magnetic source 40 is spaced more than approximately 1.00 inches away from switch part 38 thus reducing the magnetic field about switch part 38 to allow the contact of the switch part to close and power the light. The light will be off when the cover is closed so that switch part 38 is spaced less than approximately 1.00 inches from magnetic part 40 thus causing the magnetic field to open the switch part contact. Thereby light can be switched using switch 12 in one lateral position to be always on, or it can be switched at switch 12 to the opposite lateral position such that light is on or off as controlled by magnetic switch 36, or switch 12 can be positioned in its centered position such that light 11 is always off.

The above description is meant only to exemplify the inventors preferred embodiment of the invention and to enable others to reproduce it. The depiction is not intended to be limitation from other minor and obvious variations on the depicted embodiments, all of which variations are expressly included herein.

We claim:

1. An electric light assembly carried by a vehicle having a bed and an electrical power source, a rigid cover over said bed, said cover including a door pivotally attached to said cover and shiftable between a closed position and an open position relative to said bed, said light assembly comprising:
    a light fixture, including an electric light, carried by said cover;
    a magnetic switch electrically interposed between said light and said power source, said magnetic switch including a switch part carried by one of said door and said covering, and a magnetic source carried by the other of said door and said covering;
    said switch part and said magnetic source being positioned relative to each other such that when said door is in its said closed position, said magnetic switch causes said light to be in an off state, and when said door is in its said open position, said magnetic switch causes said light to be in an on state;
    a second switch interposed between said light and said power source, said second switch having a first switched position electrically connecting said light to said magnetic switch and a second switched position electrically connecting light to said power source;
    whereby when said second switch is in said first switched position, said light is either in its said on or off state as controlled by said magnetic switch, and when said second switch is in said second switched position, said light is on independent of said magnetic switch.

2. The light assembly of claim 1 wherein said second switch further includes:
    a third switched position electrically isolating said light from said power source such that said light is always off when said second switch is in said third switched position.

3. An electric light assembly carried by a vehicle having a bed and an electrical power source, a rigid bed covering over said bed, said bed and said covering defining an interior space, said covering pivotally attached to said bed and shiftable between a closed position over said space and an open position relative to said bed exposing said space, said light assembly comprising:
    a light fixture, including an electric light, inside said interior space and a magnetic switch electrically interposed between said light and said power source;
    said magnetic switch including a switch part carried by one of said covering and said bed, and a magnetic source carried by the other of said covering and said bed;
    said switch part and said magnetic source positioned relative to each other such that when said cover is in its said closed position, said magnetic source is located adjacent said switch part to cause said switch part to cause said light to be in an off state, and when said door is in its said open position, said magnetic source is sufficiently spaced from said switch part to cause said switch part to cause said light to be in an on state;
    a second switch interposed between said light and said power source, said second switch having a first switched position electrically connecting said light to said magnetic switch and a second switched position electrically connecting light to said power source;
    whereby when said second switch is in said first switched position, said light is either in its said on or off state as controlled by said magnetic switch, and when said second switch is in said second switched position, said light is on independent of said magnetic switch.

4. The light assembly of claim 3 wherein said second switch further includes:
    a third switched position electrically isolating said light from said power source such that said light is always off when said second switch is in said third switched position.

5. The light assembly of claim 4 wherein said second switch is carried by said light fixture.

6. The light assembly of claim 5 wherein said second switch is a single pole double pole switch.

7. The light assembly of claim 6 wherein said magnetic switch is spaced from said second switch.

* * * * *